March 15, 1960 — M. VAN METER — 2,928,486
WHEEL SUSPENSION AND STABILIZING MEANS FOR CHASSIS
Filed July 8, 1957 — 3 Sheets-Sheet 1

INVENTOR.
MORTON VAN METER
BY
ATTORNEYS

March 15, 1960     M. VAN METER     2,928,486
WHEEL SUSPENSION AND STABILIZING MEANS FOR CHASSIS
Filed July 8, 1957     3 Sheets-Sheet 2

*INVENTOR.*
MORTON VAN METER

ATTORNEYS

INVENTOR.
MORTON VANMETER

ATTORNEYS

United States Patent Office 2,928,486
Patented Mar. 15, 1960

2,928,486
WHEEL SUSPENSION AND STABILIZING MEANS FOR CHASSIS

Morton Van Meter, Bay City, Mich., assignor to Industrial Brownhoist Corporation, Bay City, Mich., a corporation of Delaware Application July 8, 1957, Serial No. 670,509

4 Claims. (Cl. 180—41)

This invention relates to a crane chassis or the like wheel suspension construction and more particularly to a mobile crane chassis having a set of driving wheels and at least one set of steerable wheels, the latter being so suspended from the frame as to be capable of steering movements and selectively capable or incapable of vertical movement relative to the frame.

In mobile crane constructions, it is desirable that the ground engaging wheels of the carrier be yieldably suspended from the frame so as to enable the carrier to traverse uneven ground without subjecting the crane assembly to undue shocks. Each of the steerable wheels of the carrier must be suspended substantially independently of the others because of the steering geometry which must be incorporated in the steerable wheel assembly, and this has created a problem in providing lateral stability to the crane during its operation. In other words, the provision of yieldably suspended steerable wheels has introduced an instability factor in cranes in use heretofore in that the crane supporting chassis is capable of rocking from side to side during operation of the crane when the boom of the latter extends to one side or the other of the chassis.

An object of the invention is to provide a crane carrier or chassis having a set of steerable wheels mounted adjacent to one end of the chassis to supper the latter and being selectively yieldable and rigid relative to the chassis.

Another object of the invention is to provide a steerable set of wheels for a mobile crane carrier and which provides a yieldable suspension for the carrier to absorb shocks incident to travel of the carrier over irregular terrain, but which may form a rigid support for the carrier, when desired, to prevent rocking of the latter from side to side.

A further object of the invention to to provide a selectively yieldable and rigid steerable wheel assembly for a mobile chassis adapted for use in conjunction with either single or tandem sets of steerable wheels.

Other objects and advantages of the invention will be pointed out specifically or will become apparent from the following description when it is considered in conjunction with the appended claims and the accompanying drawings, in which:

Figure 1:
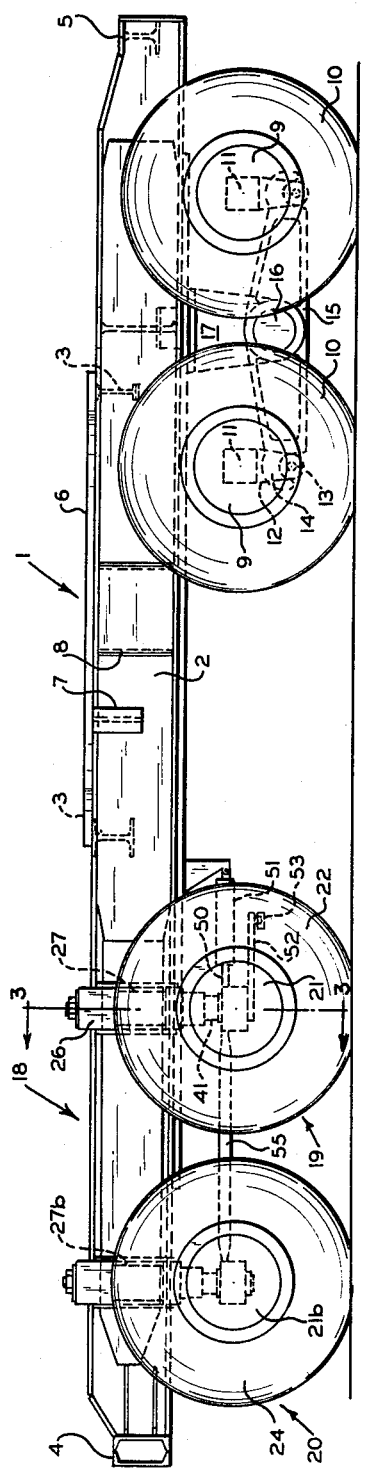
Figure 1 is a side elevational view of a crane carrier or chassis equipped with apparatus constructed in accordance with the invention.

Apparatus constructed in accordance with the form of the invention shown in Figures 1-4 is adapted for inclusion in a conventional mobile crane chassis 1 comprising a plurality of longitudinally extending, substantially parallel frame members 2 connected one to another intermediate their ends by a plurality of cross members 3. Additional cross members 4 and 5 are provided at the ends of the chassis to serve as front and rear bumpers, respectively. Intermediate the ends of the chassis is provided a platform 6 on which the crane turntable (not shown) may be supported for rotation in a known manner. The platform 6 may be reinforced by a suitable number of reinforcing members 7 and 8. (See Figure 2.)

At the rear end of the chassis is provided a tandem set of dual driving wheels 9, each of which is equipped with a tire 10 and each of which is mounted on an axle 11 spanning the width of the chassis 1. Each of the two axles 11 has connected thereto hangers 12 which support a part 13 adapted to be received in a socket 14 formed at each end of a beam 15 which is pivoted as at 16 to a support 17 fixed to the frame members of the chassis. Driving means (not shown) of any suitable kind can be connected to the driving wheels 9 for driving the latter. The driving wheels 9 and their driving means form no part of the invention per se, but it will be understood that, while the wheels 9 on the same side of the frame are capable of relative movement about the pivot 16 to reduce shocks incident to travel of the chassis over irregular ground, the suspension of the rear wheels is such that it will not permit rocking movement of the chassis from side to side.

Adjacent to the forward end of the chassis 1 of the illustrative embodiment of the invention illustrated in Figures 1-4, there is provide a steerable wheel assembly designated generally by the reference character 18 and which comprises a set of trailing and leading tandem wheels 19 and 20, respectively. The trailing set of wheels 19 includes a wheel 21 located at one side of the chassis frame and a companion wheel 21a located at the other side of the chassis frame. The wheels 21—21a are equipped with tires 22, 22a, respectively. The leading set of wheels 20 includes a wheel 21b mounted on the same side of the frame as the wheel 21 and a companion wheel 21c mounted on the other side of the frame. Each of these wheels is equipped with a tire 24 and 24a, respectively.

The mounting means for each of the wheels 21—21c is identical, is disclosed in Figure 3, and will be described with reference to the wheel 21. Means for mounting each wheel includes a bracket 25 or the like rigidly secured to and forming a part of the chassis frame 1 and being provided at its outboard end with a hollow housing 26 in which is received the upper end of a hydraulic cylinder 27, the lower end of the cylinder 27 being received in a hollow housing 28 also secured to the frame part 25. The cylinder 27 is shouldered as at 29 and the cylinder head 30 is bored for the reception of a stud 31 having a threaded end projecting through an opening in a plate 32 and receiving a nut 33 by means of which the shoulder 29 is drawn into snug engagement with the lower end of the housing 26 to fix the cylinder 27 relatively to the frame 25. When the cylinder 27 is thus positioned in the housings 26 and 28, a bleed vent 34 adjacent to the upper end of the cylinder will be in communication with an opening 35 in the housing 26, the opening 35 normally being closed by a pipe plug 36, and a port 37 adjacent to the upper end of the cylinder will be in communication with an opening 38 in the housing 26, the opening 38 being of such size as to accommodate a fitting 39 connected to a hydraulic line 40 about which more will be said subsequently.

A piston 41 is telescopingly received in the cylinder 27 for both reciprocating and rotating movements relative to the cylinder 27, the upper end of the piston being equipped with a packing 42 and a packing retainer assembly 43. A seal 44 is provided at the lower end of the cylinder 27 in engagement with the piston 41.

The wheel 21 is mounted on the spindle end 45 of a combined spindle and steering arm or lever 46 which is force fitted or otherwise suitably secured to the lower end of the piston 41 and bears against a flange 47 formed on the piston 41 adjacent to the lower end of the latter. The combined spindle and steering lever 46 includes an arm 48 on which is mounted a coupling member 49 of known construction and to which is secured an actuating arm 50 forming a part of a hydraulic cylinder steering assembly 51 (see Figure 2) of known construction and which is operable to exert pushing and pulling forces on the arm portion 48 to cause rotation of the piston 41 in the cylinder 27 and, hence, impart steering movement to the wheel 21. Also fixedly mounted adjacent to the lower end of the piston 41 is a tie rod arm 52 to which is connected a tie rod 53 of conventional construction, the other end of the tie rod 53 being connected to the tie rod arm 52a of the companion wheel 21a so that steering movements imparted to the wheel 21 will be transmitted to the wheel 21a. In some instances it may be desirable to utilize more than one hydraulic steering assembly 51 and, in the embodiment of the invention shown in Figure 2, there are two such assemblies 51.

Figure 2:
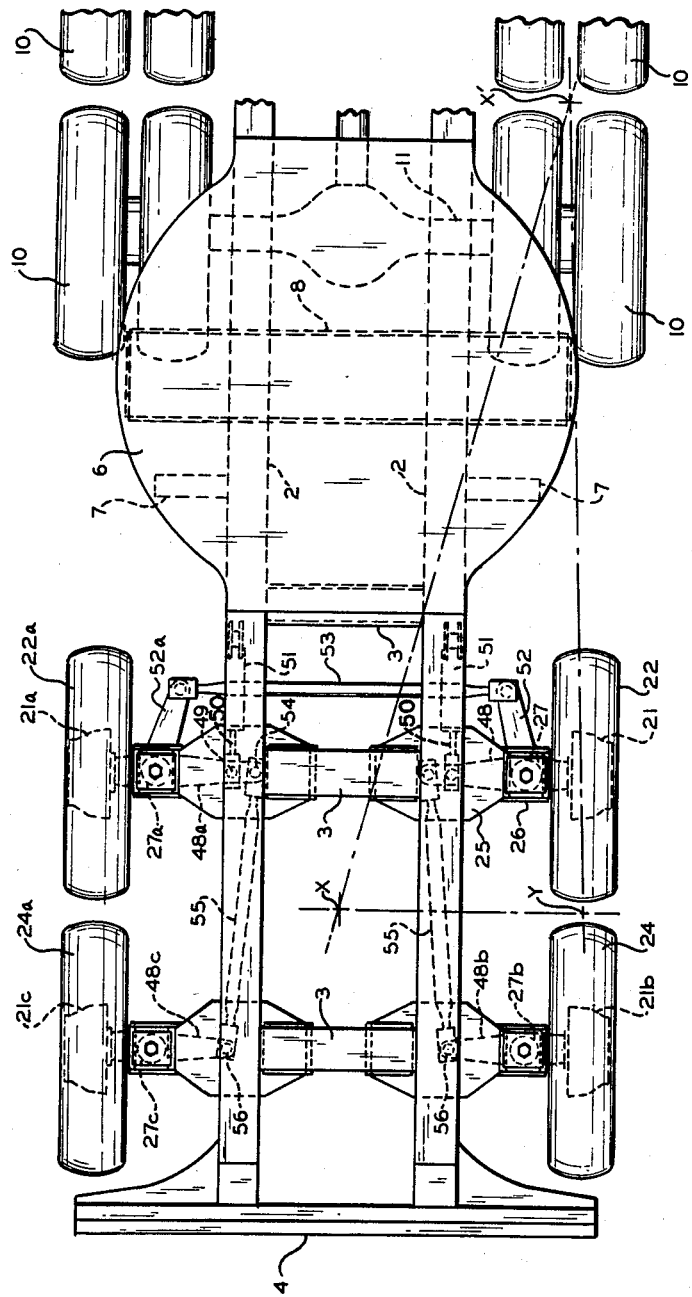
Figure 2 is a fragmentary, top plan view of the structure shown in Figure 1.
Figure 3:
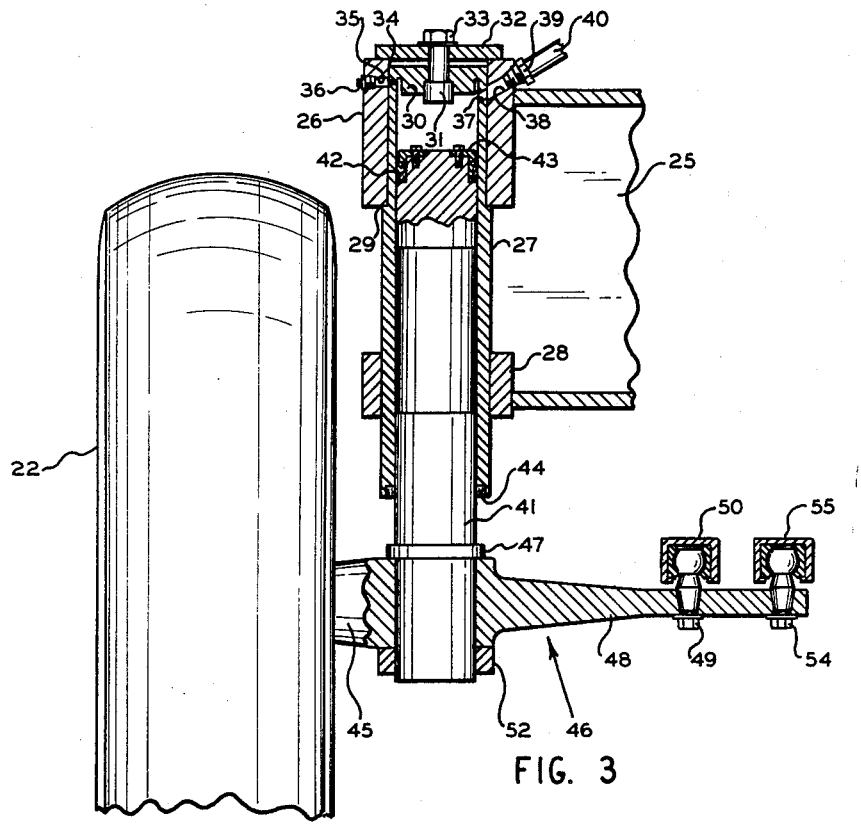
Figure 3 is an enlarged view, partly in front elevation and partly in section and taken on the line 3—3 of Figure 1, of a steerable wheel assembly formed in accordance with the invention.

As is best shown in Figures 2 and 3, each of the steering arms 48, 48a is provided with a second fitting assembly 54, similar to the assemblies 49, and to which is connected one end of a link 55, the other end of the link 55 being connected to similar fittings 56 mounted on the steering arms 48b and 48c of the wheels 21b and 21c, respectively, so that steering movements imparted to the trailing set of wheels 19 will be transmitted to the leading set of wheels 20. The effective lengths and relative positions of the various steering linkage members are such as to provide correct steering geometry at all times.

Figure 4:
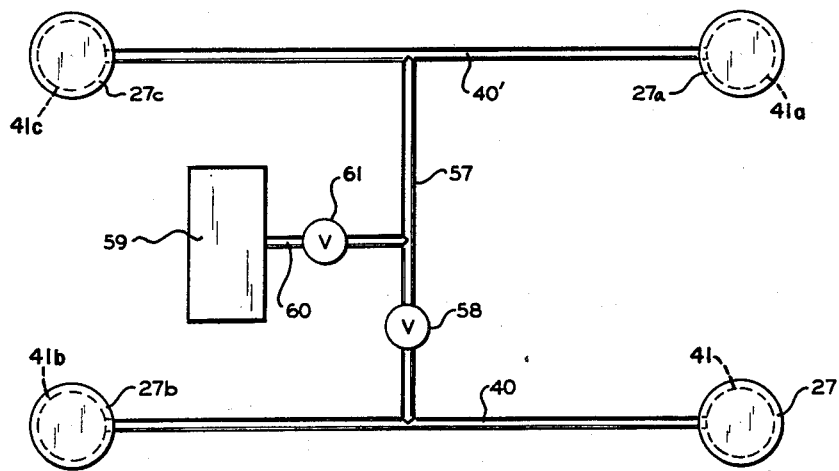
Figure 4 is a diagrammatic view of a piping system incorporated in the embodiment of the invention disclosed in Figures 1-3.

Referring now to Figure 4, therein is disclosed four cylinders 27, 27a, 27b, 27c, corresponding to the location of the wheels 21, 21a, 21b, and 21c, respectively, each of the cylinders having its wheel mounting piston 41, 41a, 41b, and 41c mounted therein in the manner previously discussed. The cylinders 27 and 27b are connected by the hydraulic line 40 and the cylinders 27a and 27c are connected by a similar hydraulic line 40'. The lines 40 and 40' are interconnected by a hydraulic line 57 which includes as a part thereof a valve 58. The system includes a hydraulic fluid reservoir 59 connected to the line 57 by a duct 60 in which is mounted a valve 61.

To condition the apparatus for operation, the valves 58 and 61 are opened so as to permit hydraulic fluid from the reservoir 59 to flow through the several lines to the wheel mounting cylinders. Hydraulic fluid is introduced to each of the cylinders in an amount sufficient to position each of the pistons as indicated in Figure 3, i.e., in such position that the distance between the flange 47 and the lower end of the cylinder 27 is substantially equal to the distance between the upper end of the piston and the cylinder head. When this condition is satisfied, the valve 61 may be closed and may remain closed until it becomes necessary to add hydraulic fluid to the system.

With the valve 58 remaining open, movement of the chassis over uneven ground will enable the steerable wheels to follow irregularities, yet maintain the carrier stable, since relative vertical movement between the frame and the wheels on one side of the chassis will displace fluid from the cylinders on the one side of the chassis and transfer it to the cylinders on the other side of the chassis so as to effect a corresponding movement of the wheels on the other side of the chassis, but in the opposite direction.

When the apparatus reaches the site at which it is to function and it is desired to operate the crane boom from the left hand side of the chassis, for example, the valve 58, if permitted to remain open, would permit rocking movement of the chassis from side to side along the axis indicated by the line X—X' in Figure 2 which extends from a point at the geometric center of the four steerable wheels to a point located at the geometric center of the four driving wheels at the left hand side of the carrier. If, however, the valve 58 is manipulated to its closed position, then fluid cannot be transferred from one side of the chassis to the other side of the chassis. Hence, the axis of stability of the carrier lies along the line Y—X' which extends from a point located between the two steerable wheels on the left hand side of the chassis to the same point previously referred to between the driving wheels on the same side of the chassis. If it is desired to operate the boom from the other side of the chassis, the same result is obtained. Accordingly, the tendency of the chassis to rock during operation of the crane boom from either side of the chassis is overcome.

A crane chassis constructed in accordance with the invention is intended primarily for use with cranes of free capacities, that is, those cranes which do not rely for stability upon outrigger beams. Free capacity cranes heretofore have had considerably less free lifting capacity than outrigger-equipped cranes due to the tendency of the free capacity cranes to rock about an axis corresponding to the line X—X'. When a chassis is provided with apparatus in accordance with the invention, however, the axis of rocking is shifted as described previously, thereby materially increasing the free lifting capacity of a free capacity crane.

Figure 5:
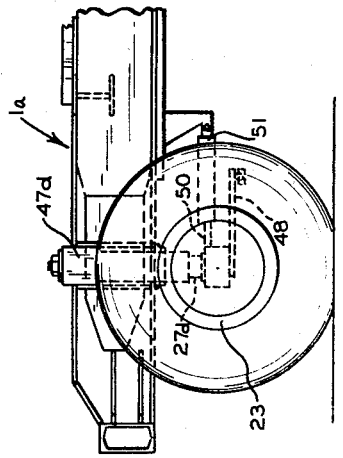
Figure 5 is a fragmentary, side elevational view of a modified form of the invention.

The principles of the invention are equally adaptable to those chassis constructions in which only a single pair of steerable wheels is provided. Such a construction is illustrated in Figure 5 wherein the chassis 1a is similar to the chassis 1 previously described except that only a single set of steerable wheels 23 is suspended from the frame. The mounting means for each of the wheels 23 is identical to the mounting means previously described and need not, therefore, be described in detail, and it will be appreciated that the hydraulic steering cylinder or cylinders 51 will be connected to the steering arm portions of the assembly in the same manner referred to earlier for imparting steering movements to the wheels 23.

Figure 6:
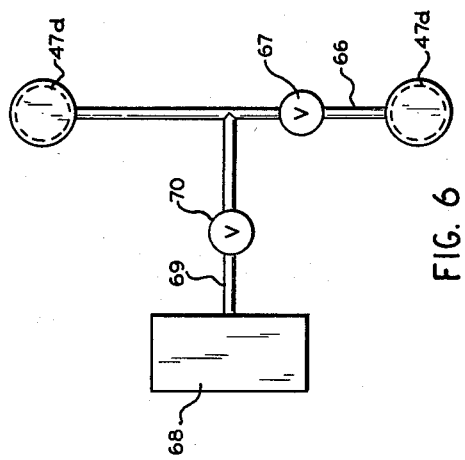
Figure 6 is a diagrammatic view of a piping system adapted for use in the embodiment shown in Figure 5.

When only one set of steerable wheels is provided, the wheel mounting cylinders 47d for the respective wheels may be interconnected by a single hydraulic line 66 (see Figure 6) in which is located a valve 67 that is manipulatable to enable or disable the transfer of hydraulic fluid from one cylinder to the other. Fluid may be supplied to the cylinders from a reservoir 68 through a line 69, the latter including a valve 70 which is closed except when the addition of fluid to the system is required.

The operation of the modified embodiment of the invention is similar to the operation of the previously described embodiment in that the wheel mounting pistons 27d are capable of vertical movement relative to the frame, when the valve 67 is open, to cushion the shocks incident to travelling over uneven ground, but are hydraulically locked against such movement when the valve 67 is closed so as to stabilize the chassis during operation of the boom from either side of the chassis.

The disclosed embodiments are representative of present preferred forms of the invention, but are intended to illustrative rather than definitive thereof. The invention is defined in the claims.

I claim:

1. A vehicle chassis comprising a frame; a set of driving wheels having at least one wheel located at one side of said frame and at least one wheel located at the other side of said frame; means mounting each wheel of said set of driving wheels on said frame; sets of steerable wheels in tandem, each set having one wheel located at one side of said frame and a companion wheel located at the other side of said frame; means mounting the wheels of said sets of steerable wheels on said frame for steering movements relative to said frame and for vertical movements relative to said frame; means connected to one of said sets of wheels in tandem for imparting steering movements thereto; means connecting said latter set of wheels to the other set of wheels in tandem for imparting steering movments thereto; means interconnecting the mounting means of each of the steerable wheel on one side of said frame with the mounting means of each of the steerable wheels on the other side of said frame for effecting relative vertical movement of said frame and at least one of said steerable wheels in response to relative vertical movement of said frame and another steerable wheel; and means forming a part of said interconnecting means for selectively enabling and disabling relative vertical movement of said frame and either of the steerable wheels at one side of said frame in response to relative vertical movement of said frame and either of the steerable wheels at the other side of said frame, the mounting means for each of said steerable wheels comprising: a cylinder fixed on said frame, a piston having one of its ends rotatably and telescopingly received in said cylinder, and a wheel supporting spindle fixed to the other end of said piston; hydraulic fluid occupying the space between said one end of each of said pistons and the adjacent end of its cylinder; and said interconnecting means comprising: a first hydraulic line joining the cylinders of the steerable wheels on one side of said frame, a second hydraulic line joining the cylinders of the steerable wheels on the other side of said frame, and a third hydraulic line joining said first and second hydraulic lines.

2. A vehicle chassis comprising a frame; a set of driving wheels having at least one wheel located at one side of said frame and at least one wheel located at the other side of said frame; means mounting each wheel of said set of driving wheels on said frame; sets of steerable wheels in tandem, each set having one wheel located at one side of said frame and a companion wheel located at the other side of said frame; means mounting the wheels of said sets of steerable wheels on said frame for steering movements relative to said frame and for vertical movements relative to said frame; means connected to one of said sets of wheels in tandem for imparting steering movements thereto; means connecting said latter set of wheels to the other set of wheels in tandem for imparting steering movements thereto; means interconnecting the mounting means of each of the steerable wheels on one side of said frame with the mounting means of each of the steerable wheels on the other side of said frame for effecting relative vertical movement of said frame and at least one of said steerable wheels in response to relative vertical movement of said frame and another steerable wheel; and means forming a part of said interconnecting means for selectively enabling and disabling relative vertical movement of said frame and either of the steerable wheels at one side of said frame in response to relative vertical movement of said frame and either of the steerable wheels at the other side of said frame, the mounting means for each of said steerable wheels comprising: a cylinder fixed on said frame, a piston having one of its ends rotatably and telescopingly received in said cylinder, and a wheel supporting spindle fixed to the other end of said piston; hydraulic fluid occupying the space between said one end of each of said pistons and the adjacent end of its cylinder; and said interconnecting means comprising: a first hydraulic line joining the cylinders of the steerable wheels on one side of said frame, a second hydraulic line joining the cylinders of the steerable wheels on the other side of said frame, and a third hydraulic line joining said first and second hydraulic lines; said enabling and disabling means comprising a valve in said third hydraulic line operable selectively to permit and prevent transfer of fluid from the cylinders on one side of said frame to the cylinders on the other side of said frame.

3. A vehicle chassis comprising a frame; sets of wheel assemblies for said frame including a set of steerable wheel assemblies, said set of steerable wheel assemblies having one wheel assembly located at one side of said frame and another wheel assembly located at the other side of said frame; a separate wheel spindle for each steerable wheel assembly; one of said sets of wheel assemblies being driven; means mounting each of said steerable wheel assemblies on said frame including means for mounting each of said steerable wheel assemblies for turning movement in a vertical plane, and each of said last named mounting means comprising a cylinder member and a piston member having one of its ends telescopically received in said cylinder member; one of said members being fixed on said frame and the other of said members being joined to a corresponding one of said spindles; means connected to said spindles for imparting steering movements to the latter; an incompressible fluid occupying the entire space between one end of said piston members and the adjacent end of the corresponding cylinder member; interconnecting means joining the cylinder member on one side of the frame with the cylinder member on the other side of the frame comprising line means filled with incompressible fluid; and valve means forming a part of said interconnecting means for selectively enabling and disabling relative vertical movement of said frame and the steerable wheel assembly at one side of said frame in response to relative vertical movement of said frame and the steerable wheel assembly at the other side of the frame.

4. A vehicle chassis comprising a frame; sets of wheel assemblies for said frame including a set of steerable wheel assemblies, said set of steerable wheel assemblies having one wheel assembly located at one side of said frame and another wheel assembly located at the other side of said frame; a separate wheel spindle for each steerable wheel assembly; one of said sets of wheel assemblies being driven; means mounting each of said steerable wheel assemblies on said frame including a cylinder member and a piston member having one of its ends rotatably and telescopically received in said cylinder member; one of said members being fixed on said frame and the other of said members being fixed to a corresponding one of said spindles; means connected to said spindles for imparting steering movements to the latter; an incompressible fluid occuping the entire space between one end of each of said piston members and the adjacent end of the corresponding cylinder member; interconnecting means joining the cylinder member on one side of the frame with the cylinder member on the other side of the frame comprising line means filled with incompressible fluid; and valve means forming a part of said interconnecting means for selectively enabling and disabling relative vertical movement of said frame and the steerable wheel assembly at one side of said frame in response to relative vertical movement of said frame and the steerable wheel assembly at the other side of the frame.

References Cited in the file of this patent
UNITED STATES PATENTS

| | | |
|---|---|---|
| 1,066,712 | Cooper | July 8, 1913 |
| 1,606,771 | Mitchell | Nov. 16, 1926 |
| 1,767,470 | Mitchell | June 24, 1930 |
| 1,792,794 | Zoelly | Feb. 17, 1931 |
| 1,835,112 | Hawkins | Dec. 8, 1931 |
| 1,975,119 | Oates | Oct. 2, 1934 |
| 2,184,202 | Tschanz | Dec. 19, 1939 |
| 2,381,425 | Deal et al. | Aug. 7, 1945 |
| 2,638,355 | Spangler | May 12, 1953 |
| 2,663,266 | Baldwin | Dec. 22, 1953 |
| 2,710,199 | Nickles | June 7, 1955 |
| 2,821,059 | Heitshu | Jan. 28, 1958 |

FOREIGN PATENTS

| | | |
|---|---|---|
| 25,740/35 | Australia | Dec. 18, 1935 |